(12) United States Patent
Yang

(10) Patent No.: US 8,040,667 B2
(45) Date of Patent: Oct. 18, 2011

(54) PORTABLE LCD TV

(75) Inventor: Tien Deng Yang, Taipei (TW)

(73) Assignee: Litemax Electronics Inc., New Taipei (TW)

( * ) Notice: Subject to any disclaimer, the term of this patent is extended or adjusted under 35 U.S.C. 154(b) by 941 days.

(21) Appl. No.: 12/017,073

(22) Filed: Jan. 21, 2008

(65) Prior Publication Data

US 2009/0184893 A1  Jul. 23, 2009

(51) Int. Cl.
*G06F 1/16* (2006.01)

(52) U.S. Cl. ............... 361/679.01; 40/502; 248/118; 132/269; 345/589; 349/147

(58) Field of Classification Search ............ 248/553, 248/121, 118, 125.2, 220.21, 419; 126/640, 126/643, 704, 634; 345/173, 418, 690, 589, 345/58, 83, 158; 349/114, 62, 58, 61, 147; 40/502, 591; 206/578; 361/679.05, 679.22, 361/679.06, 679.08, 679.23, 679.26, 679.02, 361/679.27, 679.07, 679.01, 679.24, 679.21
See application file for complete search history.

(56) References Cited

U.S. PATENT DOCUMENTS

| 3,358,397 | A  | * | 12/1967 | Rex ........................ 40/502 |
| 7,721,893 | B2 | * | 5/2010  | Law ........................ 206/578 |
| 2011/0061675 | A1 | * | 3/2011 | McKinley ............ 132/296 |

* cited by examiner

*Primary Examiner* — Hung Duong

(57) ABSTRACT

A portable, sturdy LCD TV is disclosed. The LCD TV is further constructed as a waterproof device and is equipped with an antenna so that the LCD TV, in addition to be used indoors as a computer monitor or TV, is also suitable for outdoor use.

9 Claims, 14 Drawing Sheets

PORTABLE LCD TV

BACKGROUND OF THE INVENTION

1. Field of Invention

The invention relates to LCDs (liquid crystal displays) and more particularly to a portable LCD TV for indoor or outdoor use.

2. Description of Related Art

Liquid crystal displays (LCD's) have grown increasingly popular as substitutes for cathode ray tubes in electronic appliances. LCD's can be driven by large scale ICs (integrated circuits) because of their low-voltage and low-power consumption characteristics. Accordingly, LCDs have been widely produced on a commercial scale for use in desktop computers, laptop computers, color televisions, etc.

Conventionally, LCD display devices are subject to breakage due to collision or damage in a humid working environment. It is typical for an LCD display or TV having a plurality of projecting knobs or keys as controls (e.g., brightness control, etc.) However, these knobs or keys are not waterproof. Hence, such types of LCD display or TV are not suitable to operate in an outdoor environment.

There is a type of waterproof LCD display commercially available. The waterproof LCD display is equipped with a plastic strip sealingly mounted around a peripheral gap of the LCD body. However, such waterproof LCD displays are not structurally strong to even withstand a mild collision.

There is a type of LCD TV commercially available. Typically, an LCD TV is installed in a room and is adapted to receive TV signals via cable, an indoor antenna, or an outdoor antenna. However, such LCD TVs are not designed to operate in an outdoor environment. Thus, a need for improvement exists.

SUMMARY OF THE INVENTION

It is therefore one object of the invention to provide a portable, sturdy LCD TV having waterproof means so that the LCD TV, in addition to be used indoors as a computer monitor or TV, is also suitable for outdoor use.

The above and other objects, features and advantages of the invention will become apparent from the following detailed description taken with the accompanying drawings.

DETAILED DESCRIPTION OF THE INVENTION

Figure 1:
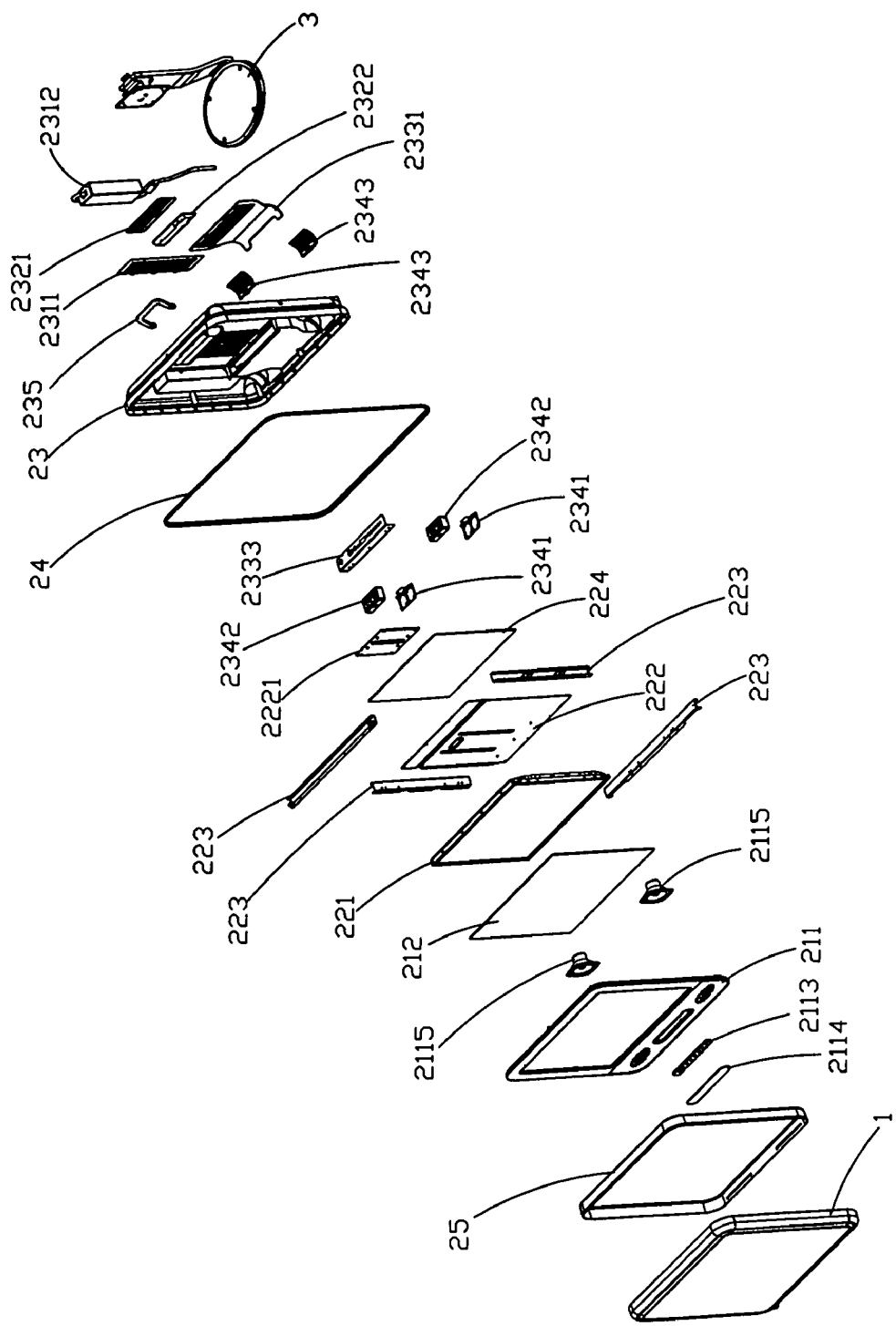
FIG. 1 is an exploded view of a preferred embodiment of LCD TV according to the invention.
Figure 2:
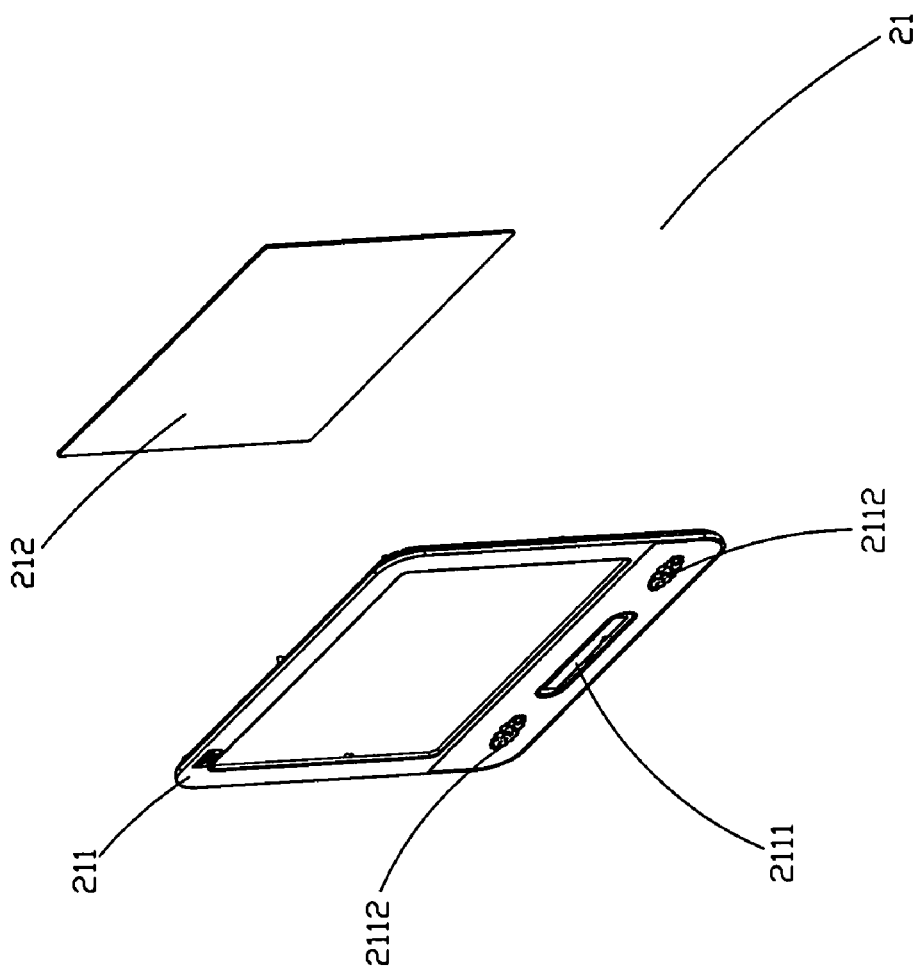
FIG. 2 is an exploded view of the frame assembly of FIG. 1.
Figure 3:
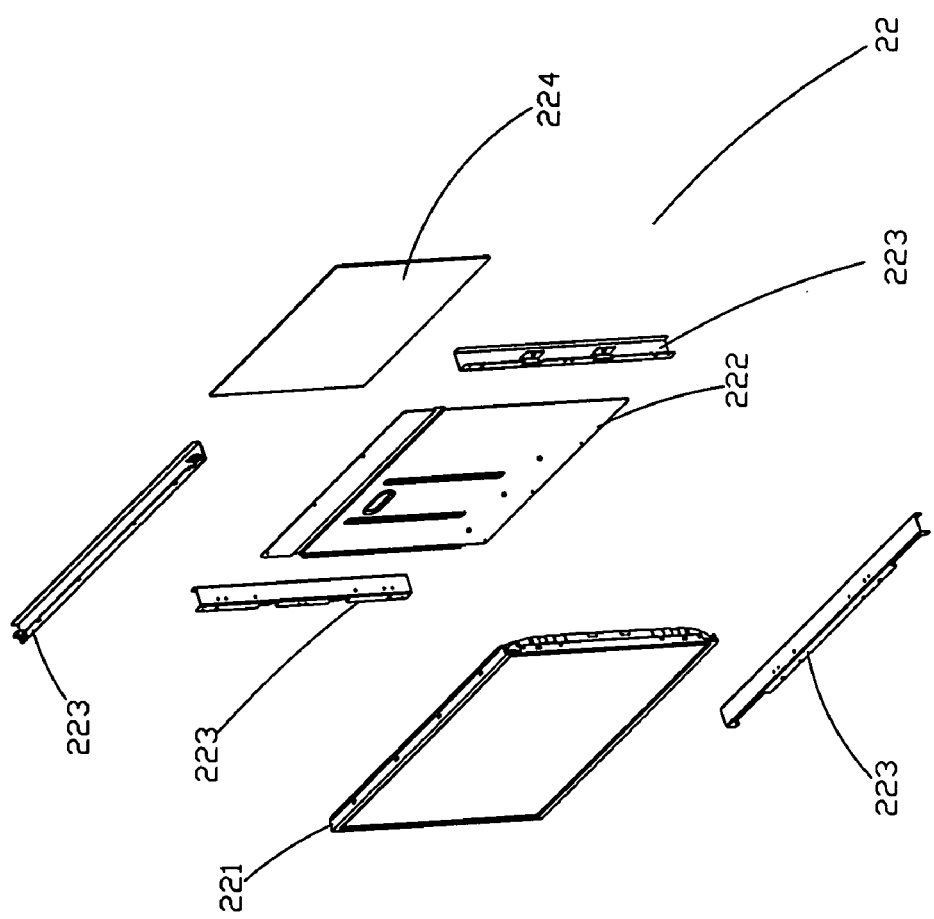
FIG. 3 is an exploded view of the panel assembly of FIG. 1.
Figure 4:
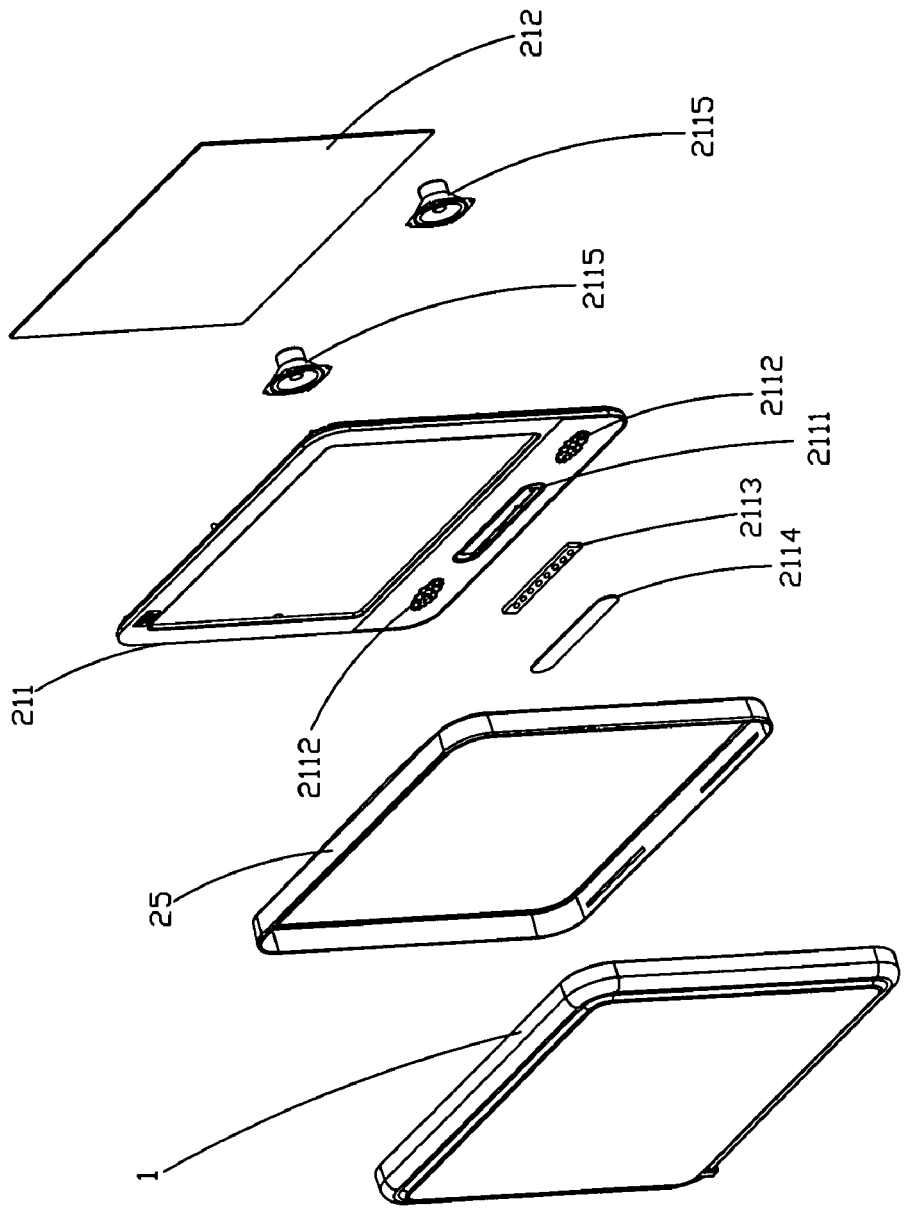
FIG. 4 is an enlarged view of some components at left of FIG. 1.
Figure 5:
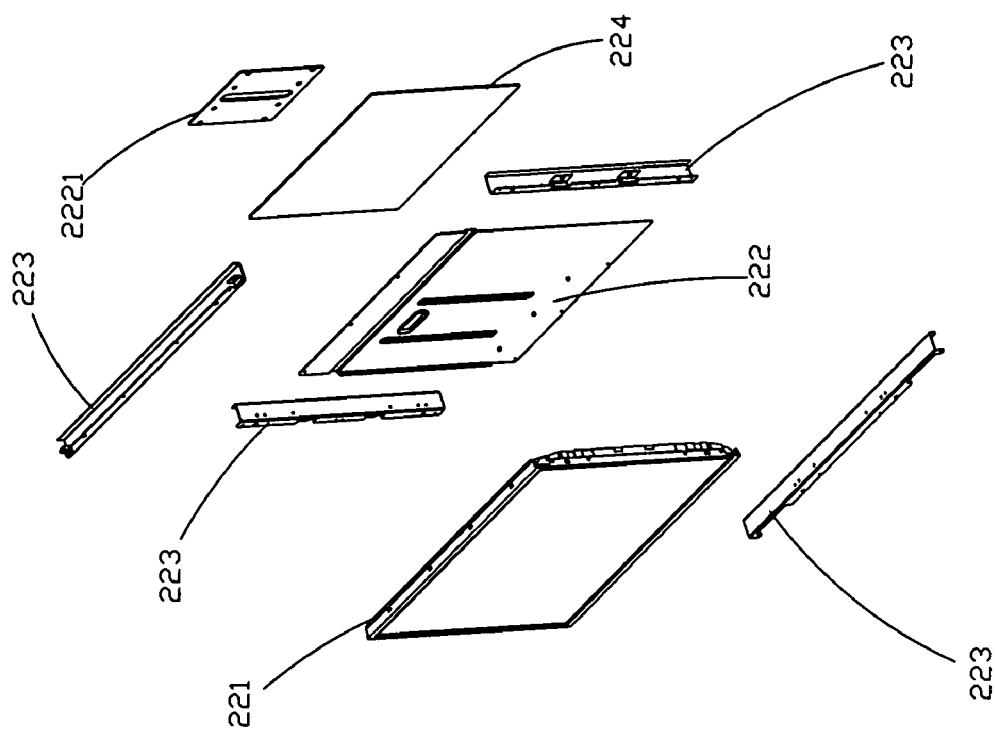
FIG. 5 is an enlarged view of some components at central part of FIG. 1.
Figure 6:
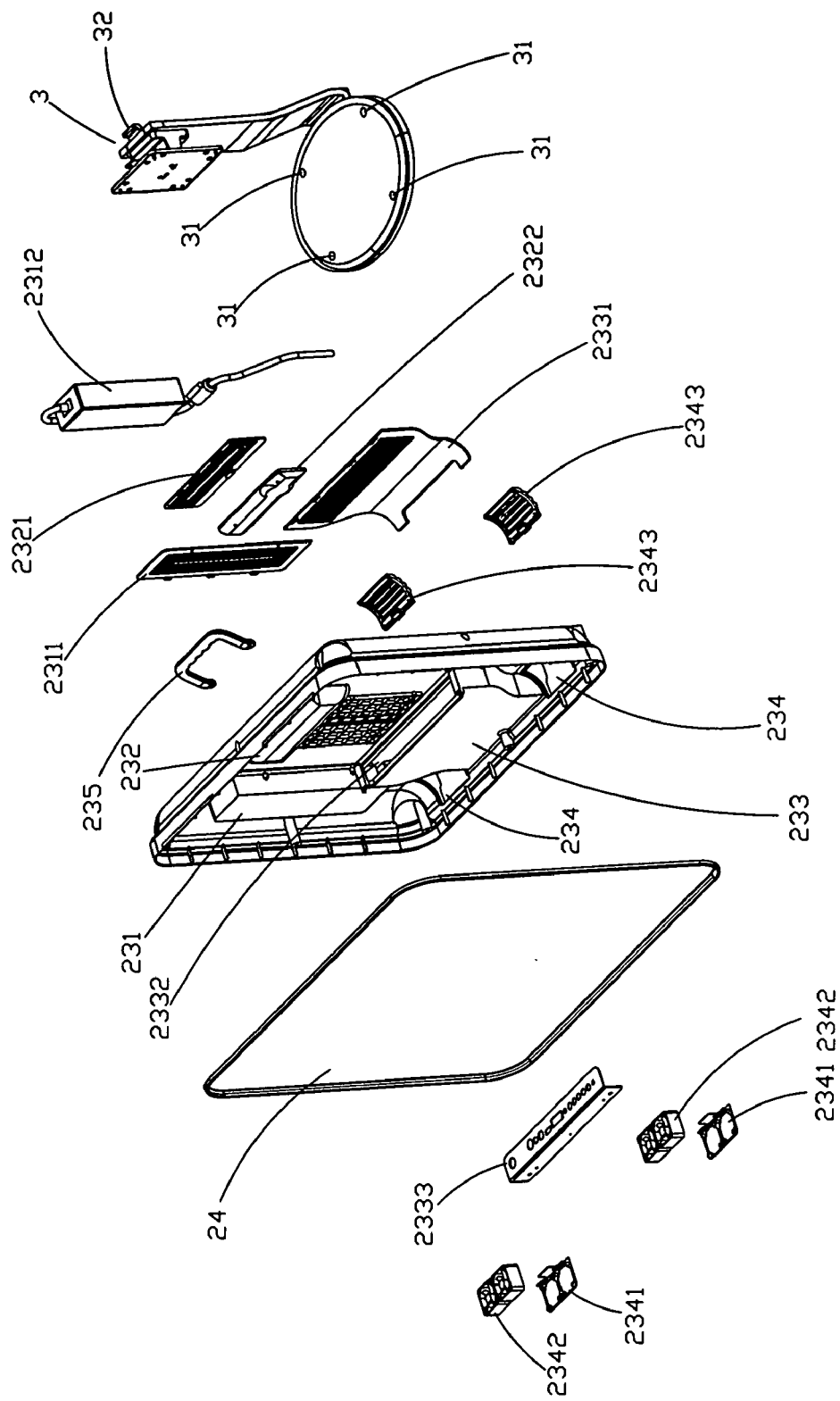
FIG. 6 is an enlarged view of some components at right of FIG. 1.
Figure 7:
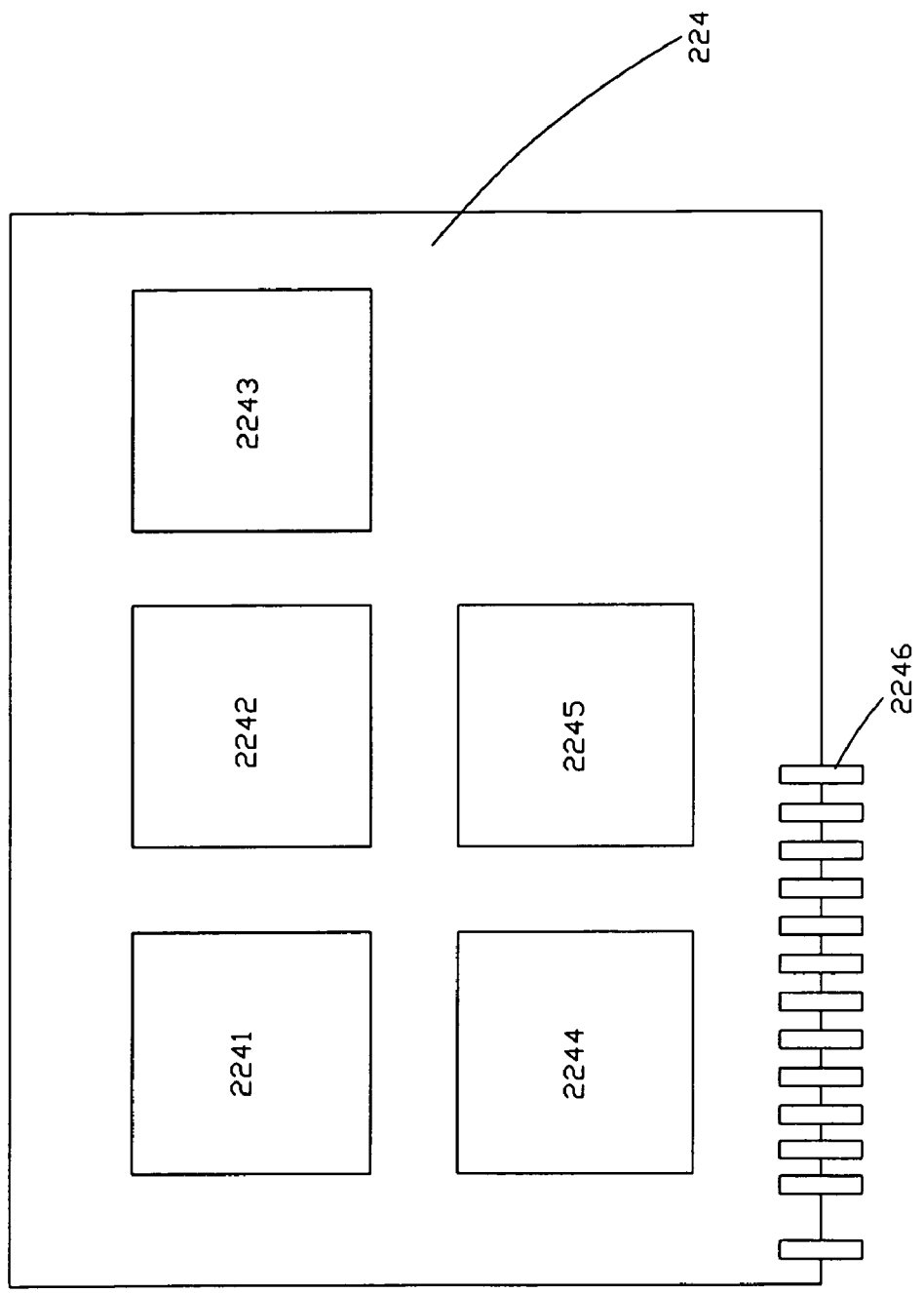
FIG. 7 is a schematic plan view of the circuit board of FIG. 5.
Figure 8:
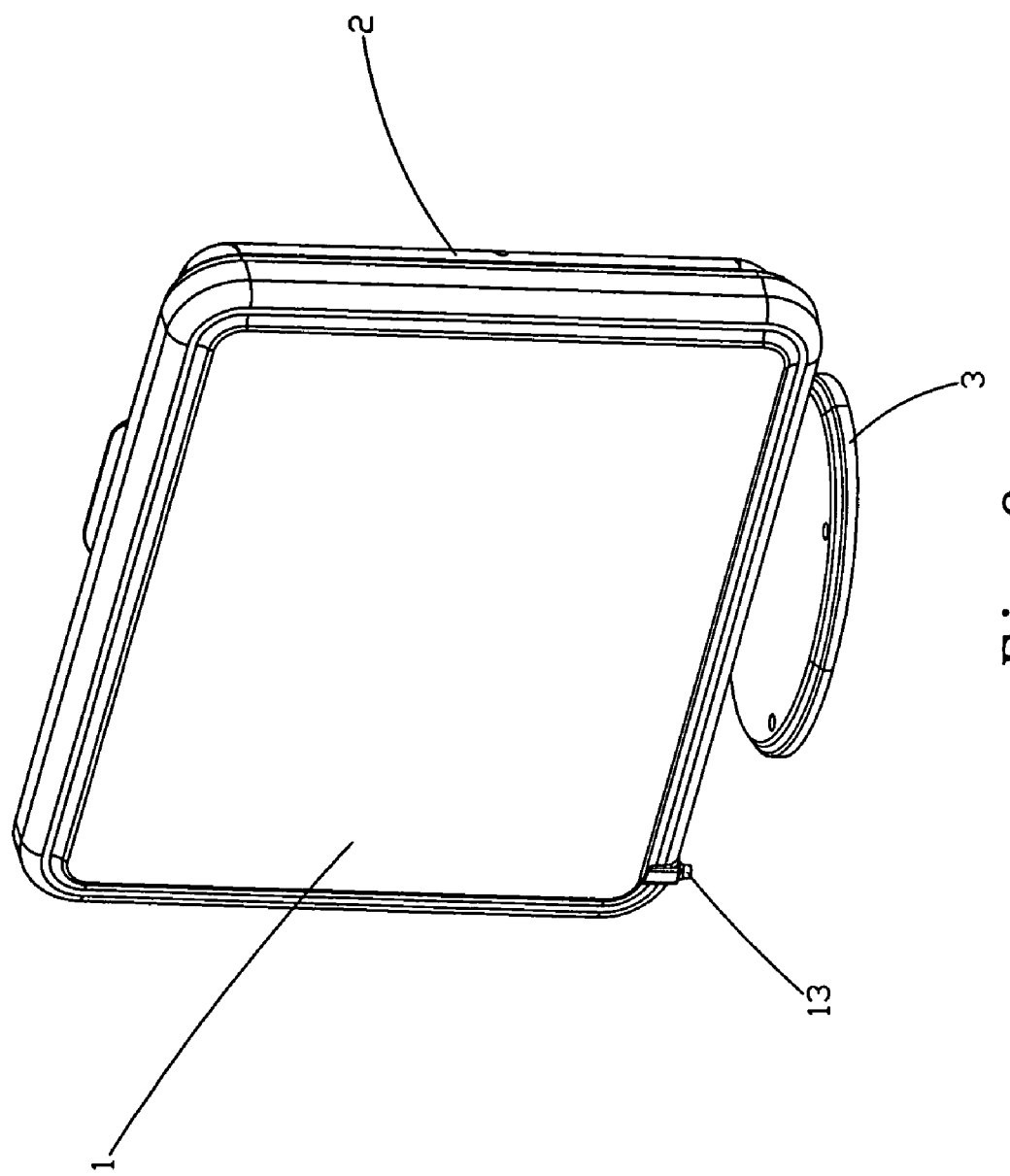
FIG. 8 is a perspective view of the assembled LCD TV viewed from front where the LCD TV is in a nonoperating position.
Figure 9:
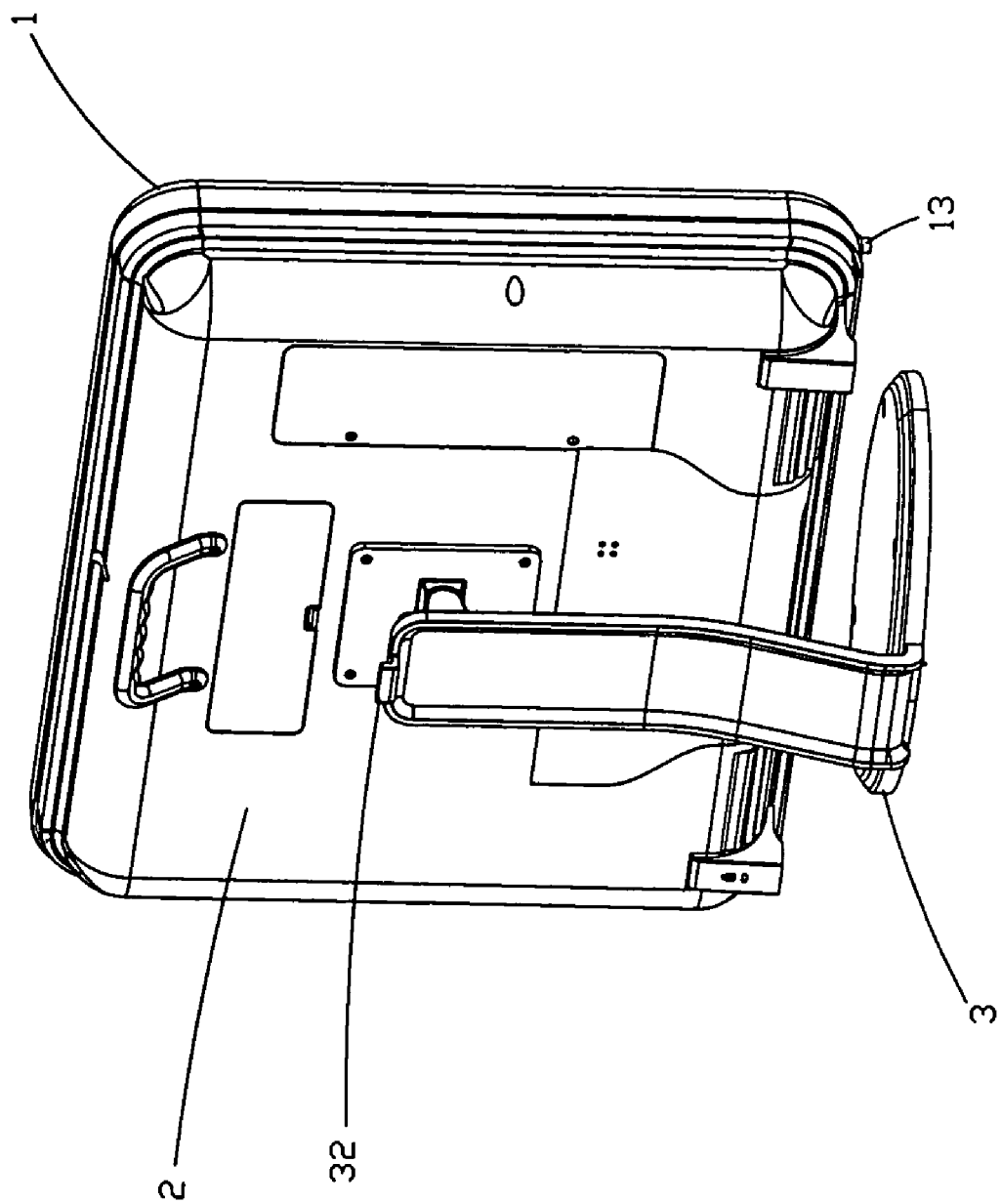
FIG. 9 is a perspective view of the assembled LCD TV but viewed from rear where the LCD TV is also in a nonoperating position.
Figure 10:
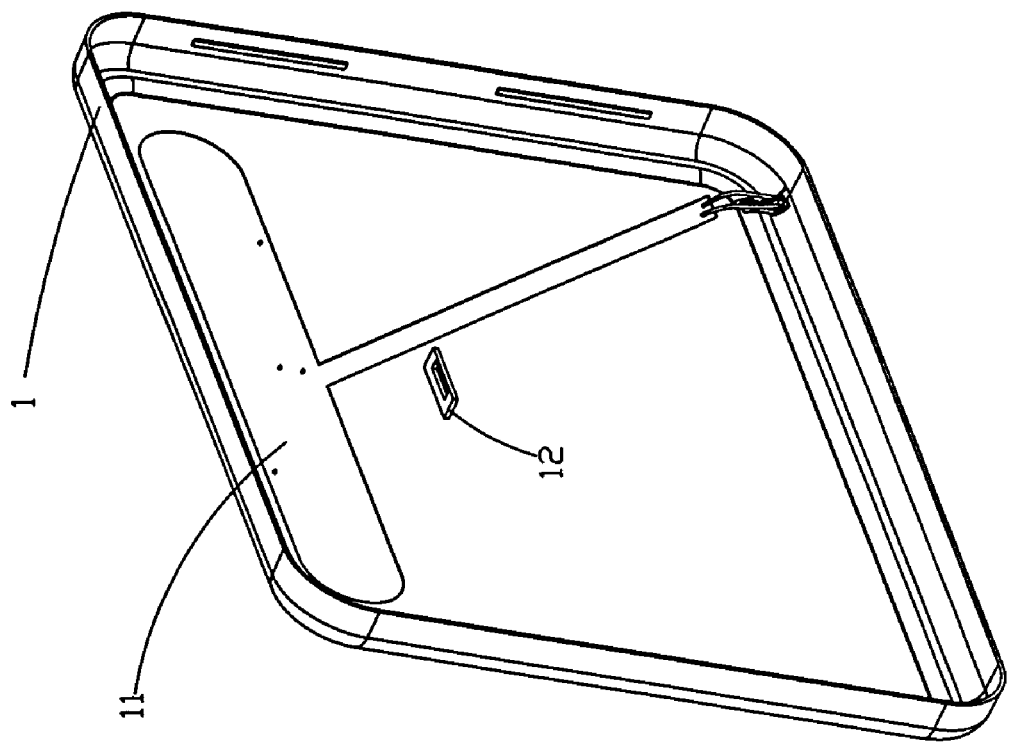
FIG. 10 is an enlarged view of the protective cover of FIG. 1 but viewed from rear.
Figure 11:
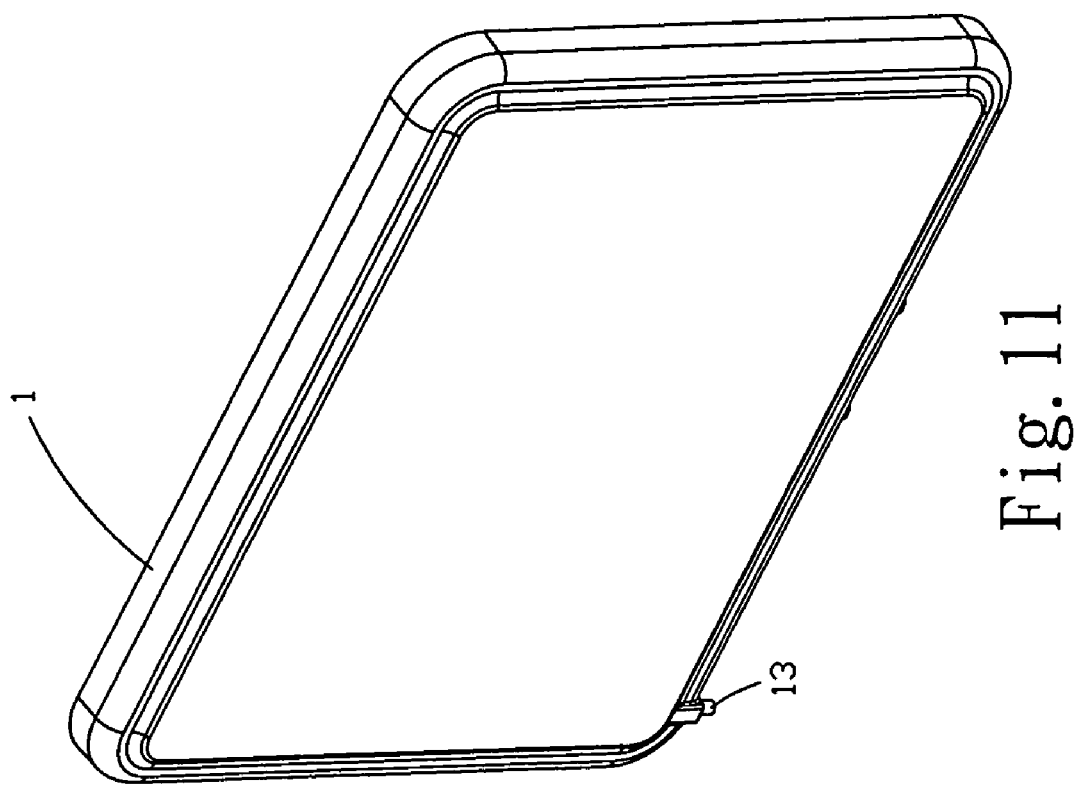
FIG. 11 is an enlarged view of the protective cover of FIG. 1.

Referring to FIGS. 1 to 14, an LCD TV in accordance with a preferred embodiment of the invention comprises a protective cover 1, a body 2, and a seat 3. Each component is discussed in detail below.

The rectangular protective cover 1 comprises an antenna 11 on the back, a rear ring-shaped member 12, and a connector 13 on the bottom edge, the connector 13 being electrically connected to the antenna 11.

The body 2 comprises a frame assembly 21, a panel assembly 22, a shell 23, a waterproof strip 24, and a frame 25.

The frame assembly 21 comprises a rectangular screen frame 211 and a protective glass 212. The panel assembly 22 comprises an LCD panel 221, a mounting plate 222, four elongated mounting members 223, and a circuit board 224.

The protective glass 212 is secured by the screen frame 211. The mounting plate 222 is secured to the back of the LCD panel 221. The four elongated mounting members 223 are secured to four sides of the LCD panel 221. The circuit board 224 is mounted onto the back of the mounting plate 222. The panel assembly 22 is secured onto the shell 23 by the mounting members 223. The frame assembly 21 is secured to the front surface of the panel assembly 22. Thus, the frame assembly 21 and the shell 23 are secured together with the panel assembly 22 being sandwiched therebetween. The rectangular waterproof strip 24 is mounted around the secured frame assembly 21 and shell 23. The rectangular, closed frame 25 is formed of rubber and is snugly put on the waterproof strip 24 so that foreign water is prevented from entering into the LCD TV through gaps between the frame assembly 21 and the shell 23. The provision of the frame 25 can prevent the body 2 from being damaged due to collision. The protective glass 212 can prevent the LCD panel 221 from being damaged due to scratch and serves as a waterproof means.

Figure 14:
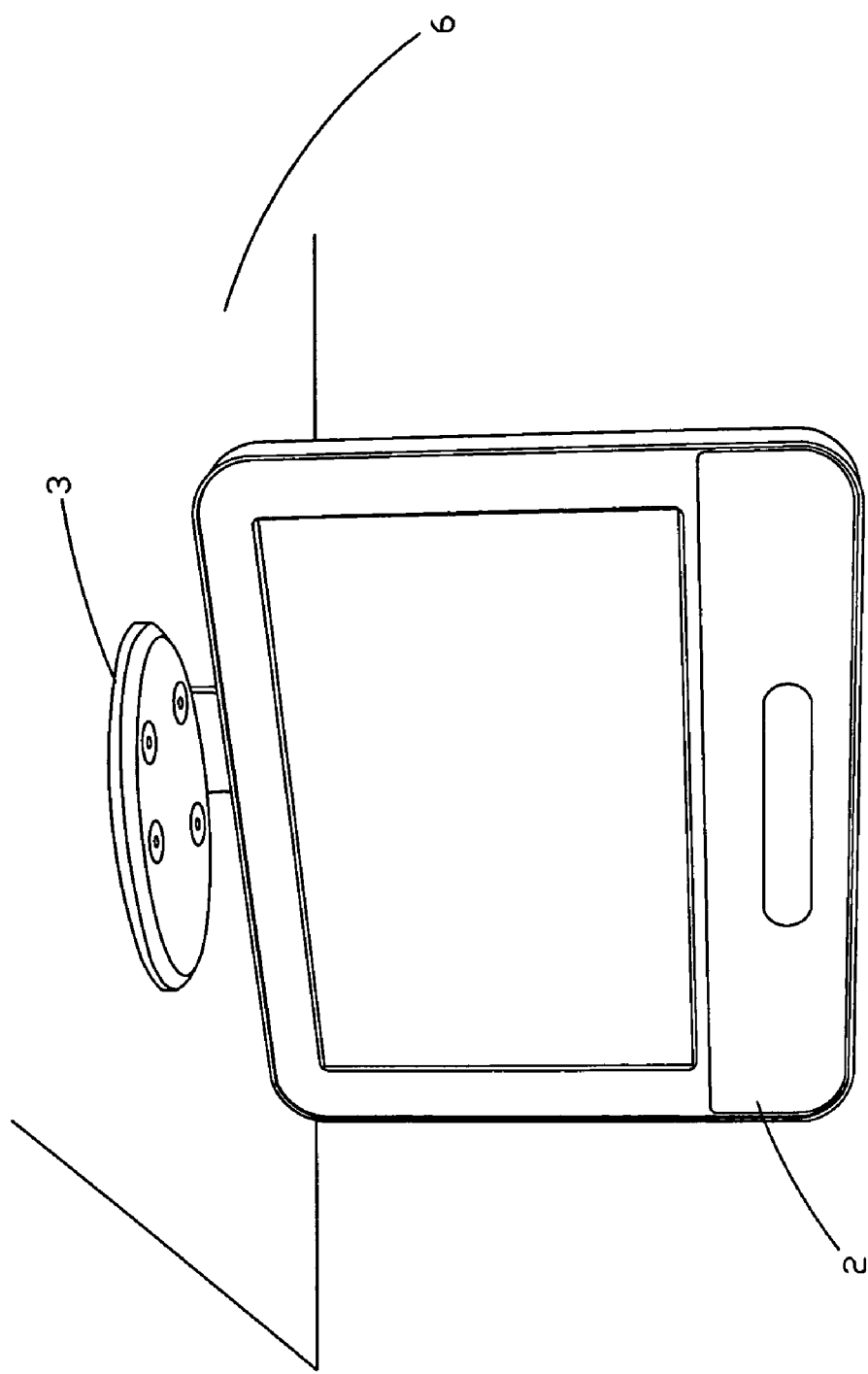
FIG. 14 is a perspective view of the LCD TV mounted on a ceiling.

The seat 3 comprises a plurality of threaded holes 31 on its base so that the seat 3 can be mounted on the ceiling 6 by driving a plurality of fasteners (e.g., screws) through the holes 31 into the ceiling 6 (see FIG. 14). The seat 3 further comprises an L-shaped tab 32 on the top of its upright arm. It is obvious that the LCD TV supported by the seat 3 can be placed on the surface of a desk 5 (see FIG. 13).

The screen frame 211 comprises an opening 2111 on a center of its lower portion, first, second plurality of apertures 2112 on both sides of the opening 2111, a touch sensitive member 2113 mounted in the opening 2111, an optical film 2114 sealingly fitted onto the touch sensitive member 2113, and two speakers 2115 mounted to the rear of the first, second plurality of apertures 2112 respectively. Both the touch sensitive member 2113 and the speakers 2115 are electrically connected to the circuit board 224. A user can point to one of the keys on the touch sensitive member 2113 by touching the touch sensitive member 2113. Thereafter, a corresponding action (e.g., brightness adjustment) is done by the circuit board 224. This has the benefit of having an aesthetic appearance. Moreover, the speakers 2115 are waterproof.

The shell 23 comprises first, second and third receptacles 231, 232, 233 each having a cover 2311, 2321, or 2331. The first receptacle 231 is for mounting an adapter 2312. The second receptacle 232 is for receiving a remote control 2322 so that the remote control 2322 can be prevented from being lost when carrying the LCD TV to an outdoor location, and the third receptacle 233 is for receiving wires and cables.

The third receptacle 233 has a receiving space 2332 and an L-shaped mounting element 2333 fitted on the mouth of the receiving space 2332. The rear of the mounting element 2333 is threadedly secured to the mounting plate 222. Two openings 234 are provided proximate both sides of a lower portion of the shell 23. A holed plate 2341 is provided on the top of each opening 234. A fan 2342 is mounted on each holed plate 2341. A louver 2343 is provided on the mouth of each opening 234. A rectangular plate 2221 is mounted on the rear of the mounting plate 222. The shell 23 further comprises a handle 235 proximate its rear top. The handle 235 is threadedly secured to the plate 2221.

The circuit board 224 comprises a control unit 2241, a panel drive unit 2242, a harmonic circuit unit 2243, an audio unit 2244, a voltage lowering unit 2245, and a plurality of parallel connectors 2246 on the edge. The connectors 2246 are electrically connected to the LCD panel 221 by wires and are secured to the mounting element 2333. Also, the connectors 2246 are electrically connected to the connector 13 by wire.

The circuit board 224 is adapted to receive VGA (Video Graphics Adapter) signals, RGB (red-green-blue) signals, AV (audio/video) signals, S-video signals, HDMI (High-Definition Multimedia Interface) signals, etc. Thus, the LCD TV also can be used as a computer monitor with multimedia features.

The control unit 2241 is adapted to process AV signals and other control signals. The panel drive unit 2242 is adapted to drive the LCD panel 221. The harmonic circuit unit 2243 is adapted to receive signals sent from the antenna 11 or TV signals sent from cable. The audio unit 2244 is adapted to amplify audio signals and drive a load (e.g., speaker). The voltage lowering unit 2245 is adapted to transfer power from the transformer 2312 into a plurality of different low voltages required for the operation of other components of the LCD TV.

Figure 12:
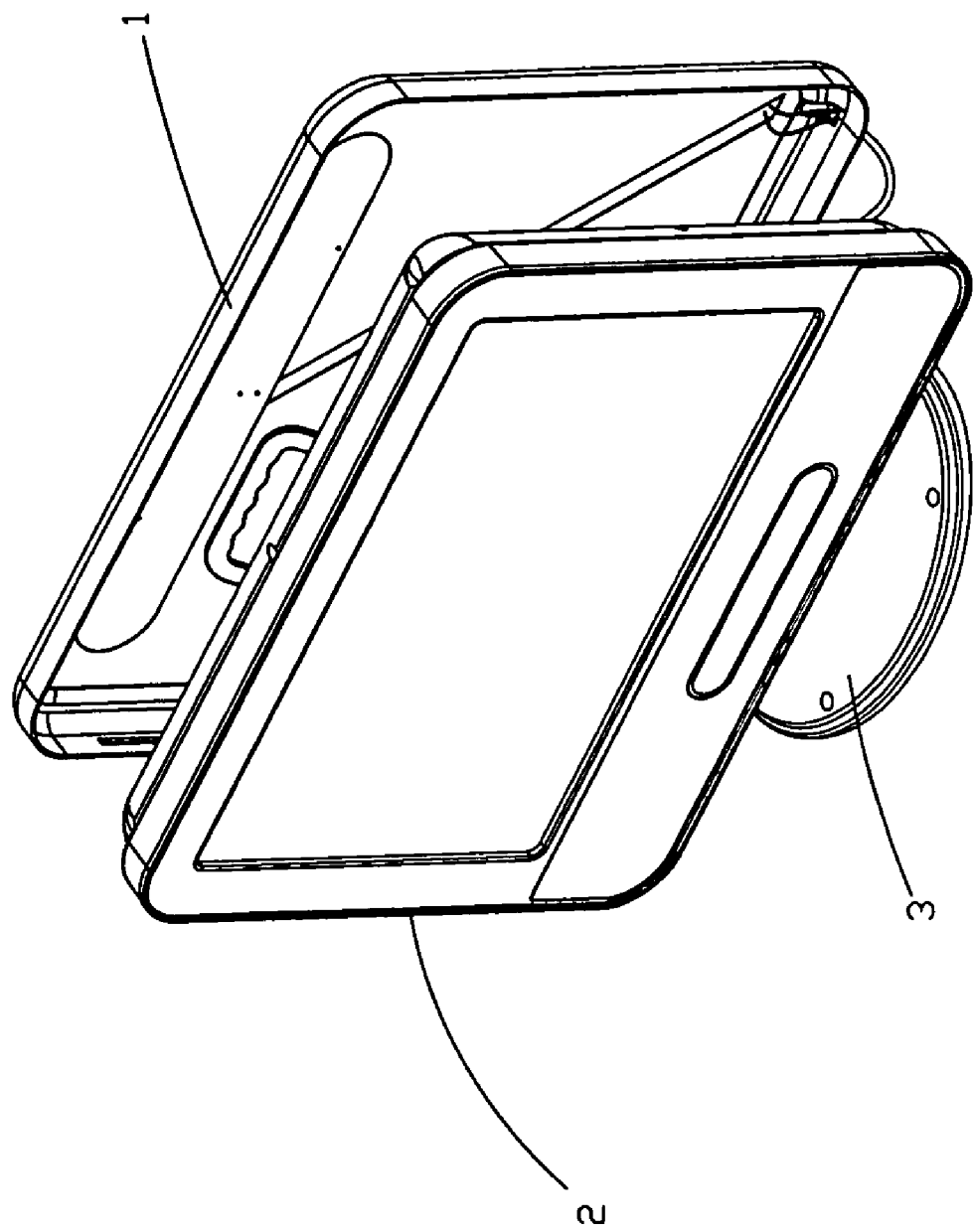
FIG. 12 is a perspective view of the LCD TV where it is in an outdoor operating position by physically disengaging the protective cover from the body but electrically connecting thereto by hanging same on the seat in the rear of the body.
Figure 13:
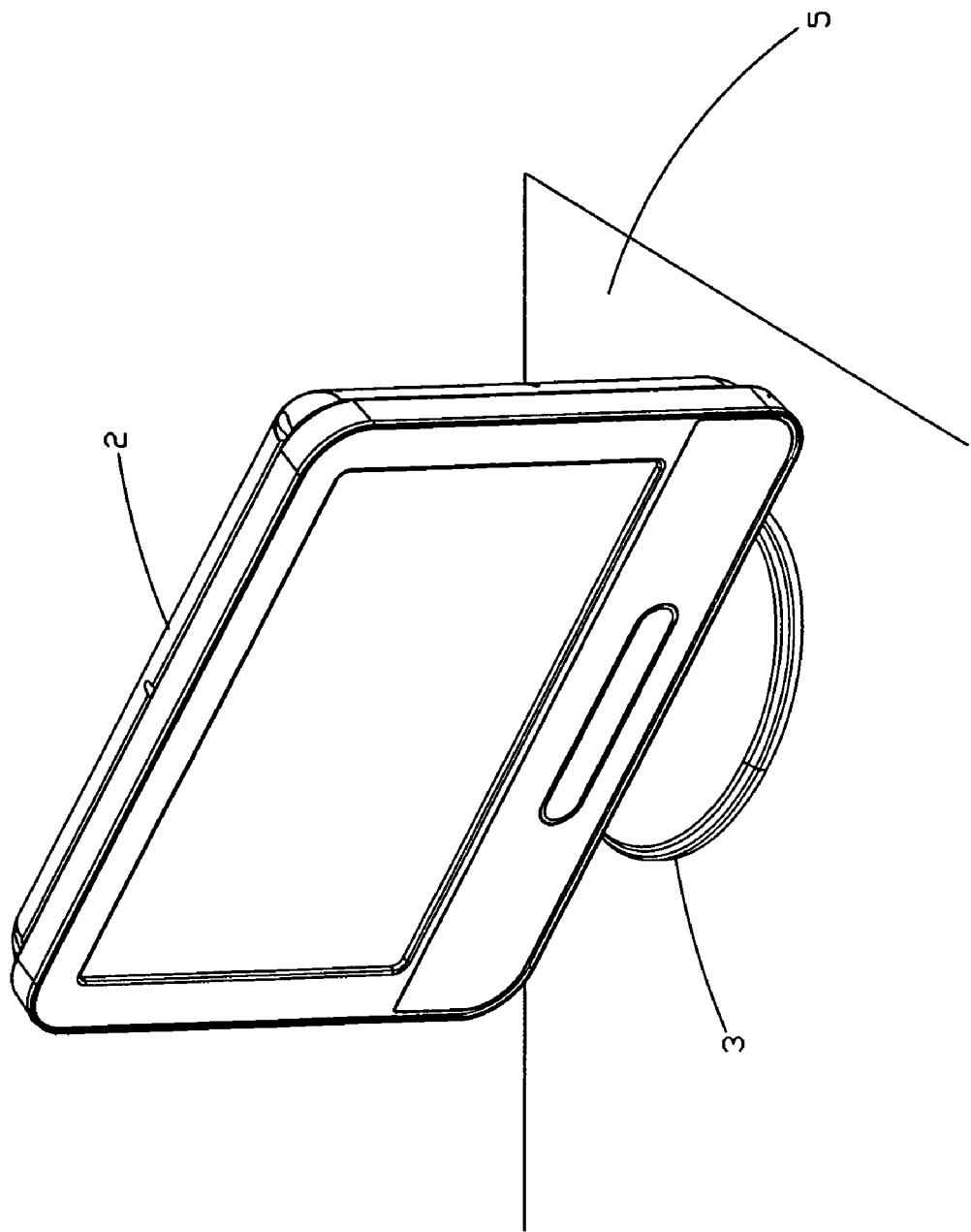
FIG. 13 is a perspective view of the LCD TV rested upon a desk with the protective cover being removed in an indoor environment.

An additional antenna is not required since the LCD TV is equipped with the antenna 11. As shown in FIG. 12, the LCD TV is used in an outdoor operating position. The protective cover 1 is physically disengaged from the body 2 but is still electrically connecting thereto with the ring-shaped member 12 hung on the tab 32 of the seat 3. Thereafter, it is possible of watching TV programs by wireless.

While the invention herein disclosed has been described by means of specific embodiments, numerous modifications and variations could be made thereto by those skilled in the art without departing from the scope and spirit of the invention set forth in the claims.

What is claimed is:

1. A portable LCD TV comprising:
   a seat (3);
   a body (2) secured to the seat (3) and comprising a frame assembly (21), a panel assembly (22), a shell (23), a waterproof strip (24), and a closed frame (25); and
   a protective cover (1) releasably secured to the body (2) and comprising an antenna (11) and a connector (13) connected to the antenna (11),
   wherein the frame assembly (21) comprises a screen frame (211) and a protective glass (212) fitted in the screen frame (211);
   wherein the panel assembly (22) is secured to the rear of the frame assembly (21) and comprises an LCD panel (221), a mounting plate (222) secured to the rear of the LCD panel (221), four elongated mounting members (223) secured around the LCD panel (221) and secured to the front of the shell (23), and a circuit board (224) mounted onto the rear of the mounting plate (222) and being electrically connected to the connector (13);
   wherein the waterproof strip (24) is sealingly mounted around the frame assembly (21) and the shell (23); and
   wherein the frame (25) is mounted on the waterproof strip (24).

2. The portable LCD TV of claim 1, wherein the seat (3) comprises a plurality of threaded holes (31).

3. The portable LCD TV of claim 1, wherein the screen frame (211) comprises a touch sensitive member (2113) on a center of its lower portion, and two waterproof speakers (2115) on both sides of the touch sensitive member (2113), and wherein the touch sensitive member (2113) and the speakers (2115) are electrically connected to the circuit board (224).

4. The portable LCD TV of claim 1, wherein the shell (23) comprises a first receptacle (231) having a covering member (2311), a second receptacle (232) having a covering member (2321), and a third receptacle (233) having a covering member (2331).

5. The portable LCD TV of claim 4, wherein the first receptacle (231) is adapted to mount an adapter (2312) therein, the second receptacle (232) is adapted to receive a remote control (2322), and the third receptacle (233) is adapted to for receive wires and cables.

6. The portable LCD TV of claim 4, wherein the third receptacle (233) has a mounting element (2333) fitted on its mouth, the mounting element (2333) being secured to the mounting plate (222).

7. The portable LCD TV of claim 1, wherein the shell (23) comprises two fans (2342) and a top handle (235).

8. The portable LCD TV of claim 1, wherein the circuit board (224) comprises control means (2241), panel drive means (2242), harmonic circuit means (2243), audio means (2244), voltage lowering means (2245), and a plurality of edge connectors (2246) electrically connected to the LCD panel (221), secured to the mounting element (2333), and electrically connected to the connector (13).

9. The portable LCD TV of claim 1, wherein the seat (3) comprises a top tab (32), and wherein the protective cover (1) further comprises a rear ring (12) adapted to hang on the tab (32) by disengaging the protective cover (1) from the body (2).

* * * * *